United States Patent [19]
Hershler

[11] 3,856,404
[45] Dec. 24, 1974

[54] METHOD AND APPARATUS FOR MEASURING VAPOR PRESSURE

[75] Inventor: Abe Hershler, New York, N.Y.

[73] Assignee: Phys-Chemical Research Corp., New York, N.Y.

[22] Filed: June 6, 1973

[21] Appl. No.: 367,612

[52] U.S. Cl............... 356/36, 356/201, 356/244
[51] Int. Cl. ............................... G01n 21/22
[58] Field of Search ......... 356/36, 37, 38, 201, 244

[56] References Cited
FOREIGN PATENTS OR APPLICATIONS
1,191,195   5/1970   Great Britain ................. 356/201

*Primary Examiner*—Ronald L. Wibert
*Assistant Examiner*—Matthew W. Koren
*Attorney, Agent, or Firm*—Wolder & Gross

[57] ABSTRACT

The relative vapor pressure of a gas is measured by exposing to the gas a sensor having a transparent substrate and a microcapillary porous surface and directing light into the substrate so that it is reflected one or more times from the porous layer as it traverses the substrate and measuring the emerging light as an indication of the relative vapor pressure. The microcapillary pores are unrestricted along their lengths, are of diameters between 100 and 400 Angstrom units and greater in depth than diameter and the microcapillary surface walls may be silane coated. The light is in the infrared, visible or ultraviolet range and is either ordinary or coherent. The light is measured by a photovoltaic or photoresistive cell either directly or in a bridge network with a vapor pressure insensitive light transmitter similar to the sensor and exposed to a common light source with the sensor. Where the gas is admixed with gasses of lower vapor pressure the lower vapor pressure gasses are first removed.

23 Claims, 8 Drawing Figures

Patented Dec. 24, 1974
3,856,404
2 Sheets-Sheet 1
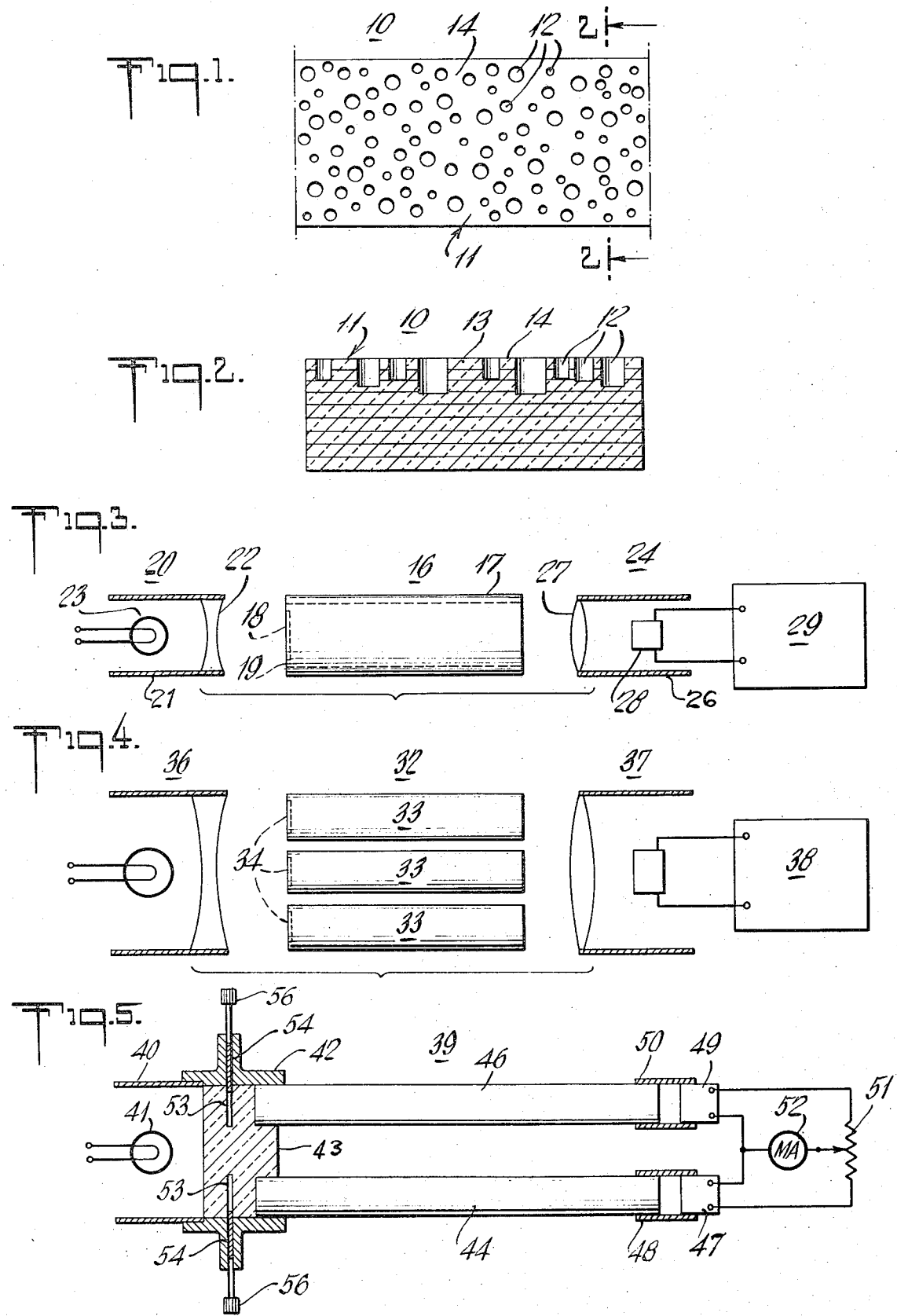

METHOD AND APPARATUS FOR MEASURING VAPOR PRESSURE

BACKGROUND OF THE INVENTION

The present invention relates generally to improvements in the measurement of gas parameters and it relates more particularly to an improved method and apparatus for the measurement of the relative vapor pressure of a gas.

In the measurement of the relative vapor pressure of an ambient gas, as, for example, the measurements of relative humidity and dew point, the sensors, apparatus and methods conventionally employed have generally been of a mechanical, chemical or electrical conductivity nature, or as described in U.S. Pat. No. 3,557,619, granted Jan. 26, 1971 to A. Hershler of an optical nature in which the evanescent light effect of a sulfonated polystyrene surface of ranging electrical conductivity is employed. The operating mechanisms of the above methods and sensors is based on chemisorption at a gas-solid interface with its consequent disadvantages. The relative vapor pressure measuring mechanisms heretofore employed are characterized by one or more drawbacks including their complexity, limited application, low versatility and application, slow response, high hystersis, low sensitivity, easily suseptible to damage and deterioration in contaminated or polluted surroundings and wide temperature variations, and they otherwise leave much to be desired.

SUMMARY OF THE INVENTION

It is an object of the present invention to provide an improved method and apparatus for the measurement of the vapor pressure of a gas.

Another object of the present invention is to provide an improved method and apparatus for measuring the relative vapor pressure of a gas.

Still another object of the present invention is to provide an improved method and apparatus for measuring relative humidity, and dewpoint.

A further object of the present invention is to provide an improved method and apparatus of the above nature characterized by their simplicity, low cost, high reliability, sensitivity and accuracy, low hysterises, high versatility and adaptability and ease and convenience of use and application.

The above and other objects of the present invention will become apparent from a reading of the following description taken in conjunction with the accompanying drawings which illustrate preferred embodiments thereof.

It has been discovered that a significant change occurs in the optical parameters at the face of a microcapillary with a change in the vapor pressure of an ambient gas and that a measurement of this parameter is an accurate indication of such vapor pressure. This parameter variation occurs not only in response to variations in relative humidity but also in response to variations in the relative vapor pressure of other gases, for example, hydrocarbons, nitrogen, xenon, oxygen, carbon dioxide, alcohols, etc. The parameter generally responds to the relative vapor pressure, that is the ratio of the ambient vapor pressure of the gas to the vapor pressure of the gas at saturation under the ambient conditions, of the gas of the lowest vapor pressure in the ambient gases.

Accordingly, the present invention contemplates the provision of a method and apparatus for measuring the vapor pressure of an ambient gas by exposing a sensing member having a microcapillary to the gas and measuring an optical parameter at the gas exposed face of the microcapillary. The sensing member is advantageously formed of a transparent matrix of substrate having a layer of microcapillary pores along a surface thereof. The optical parameter which is a function of the gas vapor pressure is determined by exposing a face of the sensing member to light, infrared, visible or ultraviolet, either ordinary or coherent, so that it is reflected one or more times from the porous layer, and measuring the emerging light as an indication of the gas vapor pressure.

Among the parameters of the sensor which determine its operation are its geometry, for example, it may be linear or curved, in the shape of a rod or flat strip or other configuration; the optical polarization of the incident light or radiation; the radiation wavelength, the capillary pore dimensions, the capillary pore shape and their density.

The transducer or sensor is fabricated in its preferred form from (borosillicate) glass ($Na_2O - B_2O_3 - SiO_2$) although other transparent substrates may be employed in the form of small cylindrical rods, beads or any rectangular or other shape; the geometry of the transducer is arbitrary and advantageously requires only polished input and output faces for the entrance and exit of optical radiation. The input radiation may be optical light rays generated by any source and the output radiation may be measured by photoresistance cells, photovoltaic cells, the human eye or any light intensity measuring means. The transduction of relative vapor pressure variations into light changes occurs at the interface between the porous glass surface where microcapillary scattering sites have been formed and the adsorbate or atmosphere to be sampled; intersecting optical rays at the pore walls are scattered in direct proportion to the relative vapor pressure or relative humidity within the microcapillary pores. The basic transducer parameters involve pore dimensions, pore shape and pore density.

Basic transducer characteristics such as calibration isotherm, (amplitude of output versus input light intensity, versus relative vapor pressure), temperature range and implicit transducer mechanical strength are all functions of the adsorbent material, processing method and final transducer geometry, including the angle of the input transducer faces with respect to the input radiation axis. The present transducer may be employed to great advantage with laser beams for remote monitoring of environmental conditions without interconnecting input and output lines or cables, i.e., within the sealed chambers of an atomic reactor or within stacks or furnace chambers operating at high temperatures or under corrosive conditions.

The principle of operation of the preferred form of relative vapor pressure sensor involves the interaction of optical radiation (e.g.) infrared—ultra violet) through a glass or transparent substrate whose surface contains a thin layer of microcapillary pores such that the optical radiation intersects the pores from within the substrate and is thereby reflected at the glass pore atmosphere boundary one or more times and is then monitored at the exit face of the sensor. It has been discovered that the reflected radiation is a direct function of relative vapor pressure or relative humidity due primarily to the scattering of the radiation by the liquid phase condensed on the walls of the micropores and by secondary effects involving slight changes of refractive index at the pore walls; in addition there is a slight birefringence in the liquid phase. The optical transmittance decreases with increasing relative vapor pressure; however, at saturation (P/Po = 1) the transmittance reverses and increases governed by a large factor.

The microcapillary pores should have a diameter or width between 60 and 400 Angstrom units, advantageously between 100 and 400 Angstrom units should be of a length or depth at least equal to and preferably greater than their diameters and should be unrestricted in transverse cross section proximate its opening and advantageously along its full length so as to be of cylindrical configuration, not necessarily of circular transverse cross section. The density of the capillary Pores on the sensor surface, that is, the number of pores, per unit area, as well as the area of the porous surface is not critical, the sensitivity of the sensor increasing with density and number of reflections of the light traversing the sensor.

The improved transducer sensor possesses characteristics which are not available and cannot be built into any of the earlier known relative vapor pressure or humidity transducers, namely:

1. Measurement of relative vapor pressure of a wide variety of gases such as water vapor, alcohol, benzene, ether, carbon tetrachloride, acetone vapors. In fact, vapors of almost all liquids and solvents can be monitored,
2. Washability and cleaning of the transducers in practically any solvent or detergent,
3. Extremely fast response time of the order of microseconds.
3a. Negligible hysteresis at all temperatures.
4. Utter simplicity and versatility of readout,
5. Extremely large temperature range of operation extending from below −100° to above +500°C,
5a. Since the relative vapor pressure of all liquids is proportional to the surface tension of the liquid against its own vapor or against air and inversely proportioned to temperature (absolute) and since the surface tension is a function of temperature (surface tension usually decreases as temperature increases), the temperature coefficient of the transducer is known analytically and is negative (in the present transducer readout opto-electrical circuit the output decreases slightly as temperature increases for a fixed relative vapor pressure), though quite small,
6. Capability of being fabricated in sub-miniature size;
7. Extremely economical in both the material and the manufacturing process thereof;
8. Capable of operation in completely sealed systems via laser beams links (e.g., monitoring gaseous or humidity conditions within atomic reactor installations or highly explosive gas installations),
9. Operation of transducers in contaminating atmospheres; e.g., stacks, bins, sealed tanks, etc.
10. A clear and obvious difference in output between the liquid and gas phases (a reversal of characteristic curve), i.e., (the sensor also behaves as a dew-point indicator by noting or measuring the temperature of the reversal point, as well as a relative vapor pressure transducer).

BRIEF DESCRIPTION OF THE DRAWINGS

FIG. 1 is an enlarged fragmentary top plan view of a vapor pressure sensor embodying the present invention;

FIG. 2 is a sectional view taken along line 2—2 in FIG. 1;

FIG. 3 is a partially diagrammatic view of an apparatus embodying the present invention;

FIG. 4 is a view similar to FIG. 4 of another form of apparatus;

FIG. 5 is a longitudinal sectional and diagrammatic view of still another form of apparatus;

DESCRIPTION OF THE PREFERRED EMBODIMENTS

Figure 6:
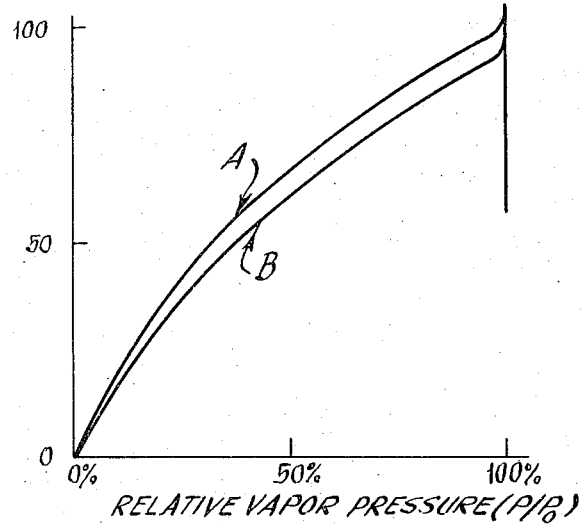
FIG. 6 is a graph illustrating the relationship between current and relative vapor pressure employing the apparatus of FIG. 5.

Referring now to the drawings, particularly FIGS. 1 and 2 thereof which illustrate a preferred embodiment of the present invention, the reference numeral 10 generally designates the improved sensor or transducer which is in the shape of an elongated rod of rectangular transverse cross-section it be noted, however, that it may be of other configuration as above set forth, for example a cylindrical rod, a flat strip, or the like. The sensor 10 includes a matrix or substrate 11 forming the body of the sensor 10 and being of a transparent material, preferably a glass, such as a borosilicate glass, although other glasses or other transparent materials may be employed. Formed in one or more longitudinal surfaces of the matrix 11 are a plurality of spaced microcapillary pores 12 which delineate a porous layer 13 with an outside face 14.

The microcapillary pores 12 are of cylindrical shape, that is, they are unrestricted along their lengths and provided with no bottlenecks, and are of diameters between 100 and 400 Angstrom units and of greater depth than diameter. The transverse end faces of the sensor 10 are highly polished or smooth to provide inlet and outlet apertures for the light entering or emerging from the sensor 10.

While other methods may be employed in producing the sensor 10, such as by bonding a porous glass layer composed of highly porous glass particles of submicron dimensions, onto a homogenous glass substrate it is preferably produced by creating a porous surface layer in a glass matrix. The following method is employed to great advantage in producing the sensor 10 because of its simplicity, economy, efficiency and versatility.

The raw material used is a borosilicate glass whose basic composition is as follows: 5% $Na_2O$, 14% $B_2O_3$, 80% $SiO_2$, the remaining ingredients being small quantities of other oxides ($Al_2O_3$, $K_2O$); commercially this type of glass is an optimum compromise between desirable optical properties, low cost, strength and optimum temperature characteristics. Other glass compositions may be used whose minor oxide components can be leached and etched leaving a silica capillary structure at the surface.

1. The glass samples are heated in a furnace to produce phase separation between the ($B_2O_3$ - $Na_2O$) and the $SiO_2$ molecular structure at a specified temperature in the range of 590°–630°C for a period of 45–170 hours.
2. The glass samples are then leached in 6.0–6.8 N HCL for 5–20 hours at 80°–110°C to dissolve out the ($B_2O_3$ - $Na_2O$) phase, leaving deep narrow bottle-neck shaped pores approximately 30–50 A in diameter primarily composed of silica.
3. The glass samples are then etched in 0.1–0.5N HF for 10–300 minutes to increase the pore diameter to approximately 100–400 A, decrease the pore depth and remove the pore bottle-necks, thereby forming an ideal porous face composed of cylindrical narrow pores.
4. Thorough washing in demineralized water at approximately 50–80°C for 30–300 minutes after steps 2 and 3 are required.
5. The glass sample ends are then ground and polished to provide transparent entrance and exit surfaces at optimum angles for the incoming and exiting radiation. This may be done prior to furnacing, and the entrance and exit faces are protected during chemical treatment.
6. Input radiation sources and output radiation detectors can then be mounted if desired onto the sensor or the sensor may be left intact for use with a remote radiative source and radiative detector, i.e., a laser beam and a photocell pick-up.

Additional processing steps may be utilized to improve sensor life, strength and speed of response as follows:

1. In heating step 1 it has been found that pre and post furnace annealing of the glass substrate improves the stability and production yield of a sensor batch. Annealing is accomplished at a temperature of 510°–580°C for 1–7 hrs.
2. After step 4 the sensor can be subjected to a silane compound (methyl silane $(CH_3)_x$ — Si — $(Cl)_y \leq 4$; where $X \leq 3$; $y \leq 3$) in gaseous form at approximately 25°C for approximately 5 minutes; this is followed by a benzene vapor wash. The procedure coats the silica capillary walls with a hydrophobic silane film (silica—silane covalent coupling) approximately 10–20 molecules thick which strengthens the glass pore walls.

In particular, since water will, over a long period of time, dissolve out the remaining $B_2O_3$ component from the glass capillary walls; the silane film stabilizes the walls against detergents and solvents used for cleaning the transducer. In addition this silanized pore wall increases the liquid-pore wall contact angle $\theta$ resulting in faster response time, smaller hysteresis and increased resistance to pore contamination. The silane film bond can withstand temperatures up to approximately 350°C.

The above briefly specifies the general fabrication procedure for the glass type relative vapor pressure transducer. However, the optimum characteristics of such a transducer is highly dependent upon the specific concentrations of the various treating solutions and the heating temperatures, heating times and general construction features which will be detailed below. At this point mention should be made of the fact that while the same sensor can be used for all gasses a slight variation of pore dimensions is capable of producing a sensor that is optimized for particular gaseous components; i.e., hydrocarbons, nitrogen, water vapor, xenon, oxygen, $CO_2$, CO, alcohols, etc.

The following procedure is given merely by way of example:

1. A typical sensor batch composed of a group of 100 rod shaped sensors (1.5 inches long by ⅛ inch O.D..) is preheated at 540°C for 4 hours and then is furnaced in jigs allowing the rods to stand upright and not touch each other, for 170 hours at 605°C±0.5° and then annealed for 4 hours at 560°C; the batch is allowed to cool to room temperature in approximately 24 hours. This process separates the phase structure of the glass and prepares the glass for removal of the boron phase.

1a. Prior to furnacing the entrance and exit faces of the glass samples are polished. After furnacing and prior to chemical treatment the entrance and exit faces of the glass samples are protected with short, shrink-fit FEP Teflon caps.

2. The sensor batch is then leached at 105°C±0.5°C under reflux conditions for 7 hours allowing approximately 40 minutes to reach equilibrium from 25°C. An optimum leaching solution is 6.4 N HCL; the leaching solution is well stirred with the samples mounted in jigs in vertical positions and not touching each other. This step effectively removes the boron-rich phase.
3. The samples are then washed at 74°±1°C in demineralized water under reflux for 60 minutes.
4. The samples are then etched in 0.256 N HF at 31°C for 40 minutes to widen and shorten the pores.
5. The samples are then washed at 74°±1°C in pure demineralized water for 60 minutes.

It is important to agitate gently (without air entrainment) all solutions during leaching and etching and to maintain proper concentrations. The sensor batch at this point has a uniform frosted appearance and upon microscopic examination shows uniform surface porosity with pore dimensions as follows:

Diameter≈100–300 A
Pore depth≈0.1–0.2 Mils
Pore shape is non-bottle neck and approximately cylindrical.

The sensors may now be silaned if desired prior to mounting light source and light pick-up fixtures at the entrance and exit faces.

For application of the transducer in vapors other than water the pore radius should be altered for optimum response for a particular gaseous vapor by altering leach and etch times; i.e., for $CCL_4$ vapor the pore radius should be approximately twice that for water vapor. However, in general it has been found that most gaseous vapor atmospheres can be measured by the same transducer which is used for water vapor by varying the sensitivity of the output radiation detector. For example, the transducer described above will function for benzene vapors, gasoline vapors, $H_2S$, $CO_2$, alcohols, etc.

While ordinary white light has been used with the transducer for all applications, the transducer response can be optimized for increased output and for peaking for particular gaseous components by selecting particular wave lengths of radiation. In particular a choice of wave length should be made consistent with the optimum response from the photo-cell output transducer.

i.e., for photovoltaic cells infra-red radiation is used; for most photo-resistance cells, red—violet radiation is utilized; for UV photo-resistive cells UV radiation is employed.

In FIG. 3 of the drawing there is illustrated an apparatus employing the improved vapor pressure sensor in accordance with the present method, the sensor 16 being in the shape of an elongated transparent rod of circular cross section. The full peripheral of the sensor has a microcapillary porous layer 17, as described above, and the end faces of the sensor are polished. A circular opaque mask is centrally positioned on the entrance end face to provide an annular light aperture 19 whereby to prevent any light traversing the sensor to the opposite exit face without being incident on the porous layer 17.

A light source 20 is coaxial with and located proximate the sensor entrance end face and includes a tubular case 21 having a concave lens 22 at one end confronting the sensor end face and housing an electric lamp 23 in its other end. Coaxially disposed at the opposite end of sensor 16 is a light responsive assembly 24 which includes a tubular case 26 coaxial with the sensor 16 and having a convex lens 27 at an end thereof confronting the sensor exit end face. A photocell 28 is housed in case 26 and may be either photovoltaic or photoresistive and has its light receiving face directed toward lens 27. The photocell 28 is connected to a network 29 which responds to the current output or resistance of photocell 29 and may be a current measuring meter or network or a resistance measuring network.

In employing the apparatus 16 the sensor is exposed to the gas whose vapor pressure measurement is desired and the lamp 23 is energized and the current generated in or the resistance of the photocell 28 is read from network 29 as an indication of the vapor pressure. The light rays from lamp 23 are caused to diverge by lens 22 and enter the annular aperture 19 and are reflected one or more times from the porous layer 17 as they traverse the sensor 16. By reason of the mask 18 no light which is not reflected from the porous layer 17 reaches the light responsive device 24 and the light which emerges from the end face of the sensor 16 is focused on the photocell 28. Since the amount of transmitted light decreases with increasing relative vapor pressure decreases in current in or increases in the resistance of photocell 28 indicates increasing relative vapor pressure. The output of the network 29 may be calibrated with gases of known relative vapor pressures. It should be noted that the sensor response sharply reverses when the gas relative vapor pressure reaches 100 percent and the photocell current sharply increases where it is photovoltaic and its resistance sharply drops where it is photoresistive.

The light source 20 may be a laser beam generator and remotely spaced from the sensor 16 and the photo-sensitive device may likewise be remotely positioned.

In order to increase the response of the vapor pressure measuring apparatus the porous area may be increased in the manner illustrated in FIG. 4. The apparatus 32 illustrated in FIG. 4 differs from that shown in FIG. 3 in that a plurality of parallel, transversely spaced, coextensive similar sensors 33 are provided. Each of the sensors 33 are similar to sensor 16 and is provided at its entrance end face with a circular mask 34 delineating an annular aperture. Provided at opposite ends of the group of sensors 33 are a light source 36, and a light response device 37 corresponding to light source 20 and device 24 respectively, the light responsive device 37 being connected to a measuring network 38. The light source 36 is of a size sufficient to expose all of the sensors 33 and the light responsive device is of a size sufficient to receive the light emerging from the exit end faces of all of the sensors 33. The operation of the apparatus 32 is similar to that last described.

In FIG. 5 of the drawing there is illustrated another form of apparatus embodying the present invention in which fluctuations of the light source do not effect the measurement. Specifically the apparatus 39 includes a case 40 which houses a lamp 41 and has an open end which partially nests in a collar 42. Also nesting in collar 42 is a transparent core member 43 having a pair of spaced forwardly directed sockets formed therein in cooperation with the collar 42. One end of a rod shaped vapor pressure sensor 44 of the construction specifically described above engages one of the core sockets and the other core socket is engaged by an end of a light transmitting rod 46 of the same shape and material as the sensor 44 but lacking the porous layer so as to be insensitive to the ambient gases.

A first photovoltaic cell 47 is coupled to the outer end of sensor 44 by a collar 48 and a second photovoltaic cell 49 is coupled to the outer end of the light transmitter rod 46 by a collar 50. The positive terminal of one photocell is connected to the negative terminal of the other photocell and the other terminals of the photocells are connected to respective opposite ends of a potentiometer 51. The arm of potentiometer 51 is connected to one terminal of a microammeter 52 the other terminal of which is connected to the junction of the photocells 47 and 49. In order to differentially adjust the amount of light entering the sensor 44 and light transmitter rod 46, wells 53 are formed in core 43 and slidably engage masks 54 each of which is longitudinally adjusted by knobs 56 connected thereto by slide rods.

In employing the apparatus 46 the potentiometer 51 and the masks 54 are adjusted while the lamp 41 is energized and the ambient gas relative vapor pressure is zero to give a zero reading on the bridge meter 52. The meter may then be calibrated for different gas relative vapor pressures and the apparatus may then be employed in the manner described above.

It should be noted that other forms of differential networks and photocells may be used in place of those shown in the network of FIG. 5. For example, photoresistors may be substituted for the photovoltaic cells 47 and 49 and a voltage source connected across opposite corners of the bridge network or each of the photocells 47 and 49 may be connected to a respective coil of a differential type bucking coil microammeter. In the latter case, if photoresistors are employed instead of photovoltaic cells a source of current is connected in series with the photocells.

In FIG. 6 of the drawings there are illustrated graphs showing the relationship of current to relative vapor pressure of water vapor and glycerine vapor respectively, the measurements being made with the apparatus of FIG. 5 with the sensor element specifically described, the apparatus having been adjusted for a zero reading at 0 percent relative humidity. Curve A is that for water vapor, that is relative humidity, at temperatures of 25°C and 50°C wherein the response is the same showing substantial independence of the response to temperature. The dissipation of light through the porous layer increases with increases in relative vapor pressure as a function which is not quite linear and when the relative vapor pressure reaches 100 percent there is sharp almost vertical drop in the light dissipation at the porous layer and a corresponding drop in current, and this sharp discontinuity in the curve can be employed as an accurate indication of 100 percent relative vapor pressure or dewpoint. Curve B is a curve similar to curve A but applied to the measurement of the relative vapor pressure of glycerine and differs from curve A only in that the light dissipation at the porous layer and hence the current response is slightly less.

Figure 7:
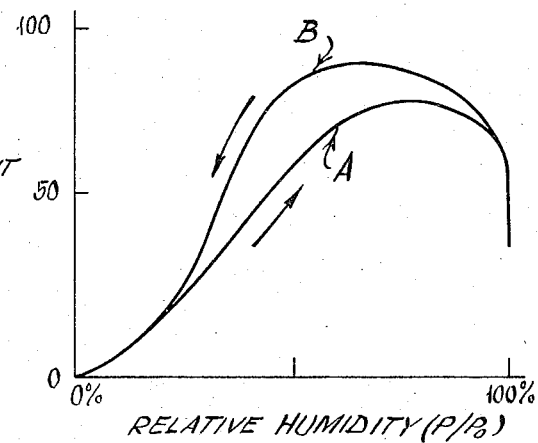
FIG. 7 is a graph illustrating the relationship between current and relative humidity wherein the capillary pores of the sensor were not cylindrical.
Figure 8:
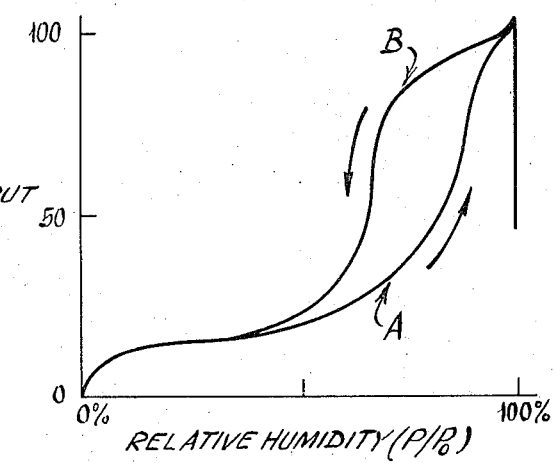
FIG. 8 is a graph similar to FIG. 7 wherein the sensor pores were restricted proximate their openings.

In FIGS. 7 and 8 there are illustrated curves of relative humidity at 25°C versus light dissipation at the porous layer as indicated by the bridge current readings where the capillary pores are non-cylindrical and where they are bottle necked or restricted at their openings respectively. In FIG. 7 representing the non-cylindrical capillary pores with increasing relative humidity, as shown by curve A the current reading is substantially less than with decreasing relative humidity as shown by curve B demonstrating a significant hysteresis effect. A similar effect is experienced where the capillary pores are of bottle neck configuration as illustrated in FIG. 8 wherein curves A and B represent increasing and decreasing relative humidity respectively.

While there have been described and illustrated preferred embodiments of the present invention it is apparent that numerous alterations, omissions and additions may be made without departing from the spirit thereof.

I claim:

1. An apparatus for measuring the vapor pressure of a gas comprising a sensing member formed of a radiation transmissive material and having a plurality of microcapillary pores formed in a surface thereof with the inside faces of said pores being exposable to said gas, means for exposing said pores to radiation and radiation sensitive means responsive to a fraction of said radiation incident on said pores which fraction is responsive to the condensation of said gas on the faces of said pores as a function of said vapor pressure.

2. An apparatus for measuring the vapor pressure of a gas comprising a transparent sensing member having a plurality of microcapillary pores formed in a surface thereof, upon the faces of which pores said gas condenses as a function of said vapor pressure, means for providing light to a first section of the surface of said sensing member so that at least a portion thereof is incident on said pores, and light responsive means exposed to the light emerging from a second section of the surface of said sensing member.

3. The apparatus of claim 2 wherein said pores having diameters between 100 and 400 Angstrum units.

4. The apparatus of claim 3 wherein said pores have depths at least equal to their diameters.

5. The apparatus of claim 4 wherein said pores are unconstricted proximate their respective openings.

6. The apparatus of claim 2 wherein the surfaces of said pores are silane coated.

7. The apparatus of claim 2 wherein said light responsive means comprises a photocell and including means for measuring a parameter of said photocell responsive to the light incident therein.

8. The apparatus of claim 2 wherein said sensing member comprises an elongated rod having said pores formed in a longitudinal face thereof and having light transmitting first and second faces at opposite ends thereof defining said first and second sections respectively.

9. The apparatus of claim 8 including a standard member defining transparent second rod having opposite first and second light transmitting faces, said light means comprising a common light source exposed to the first faces of said sensing and standard members, said light responsive means comprising a pair of photocells exposed to the light emerging from said second faces and means for measuring a relationship of a parameter of said photocells responsive to the light incident thereon.

10. The apparatus of claim 8 including a plurality of said sensing members spaced from and parallel to each other, the first faces thereof being exposed to said light and said light responsive means being exposed to the light emerging from said second faces.

11. The apparatus of claim 8 including means for masking a predetermined area of said first face.

12. A vapor pressure sensor comprising a transparent body member having microcapillary pores formed in a surface thereof, said pores having diameters between 100 and 400 Angstram units and depths at least equal to said diameters.

13. The sensor of claim 12 wherein said pores are unconstricted proximate the open ends thereof.

14. The sensor of claim 13 wherein the surfaces of said pores are silane coated.

15. The method of measuring the vapor pressure of a gas comprising exposing the inside faces of a plurality of microcapillaries to said gas, exposing said microcapillaries to radiation and measuring said radiation after exposure to said microcapillaries as an indication of said vapor pressure.

16. The method of claim 15 wherein said micracapillaries have widths between 100 and 400 Angstrom units.

17. The method of claim 15 wherein said microcapillaries are unconstricted along the lengths thereof.

18. The method of claim 15 wherein said microcapillaries are formed in a radiation transmitting substrate and said optical measurement comprises exposing said substrate to said radiation to direct at least a portion thereof through said substrate onto the faces of said microcapillaries and measuring said radiation which is a function thereof dissipated at said microcapillary faces.

19. The method of claim 15 wherein said microcapillaries are formed in a surface layer of a transparent substrate exposed to said gas, said microcapillaries having diameters between 100 and 400 Angstrom units and lengths exceeding said diameters and said measurement comprises directing light into said substrate with at least a portion thereof being incident on said surface layer and measuring the value of said light which is a function of the dissipation thereof at said surface layer.

20. The method of claim 19 wherein the value of said light reflected from said surface layer and emerging from said substrate is measured.

21. The method of claim 15 wherein said gas is contained in a mixture of gasses and has a lower vapor pressure than the other gasses in said mixture.

22. The method of claim 15 wherein said gas comprises water vapor.

23. The method of claim 15 wherein said gas comprises water vapor and the singularity temperature of said vapor pressure is measured as the dew point.

* * * * *